United States Patent [19]
Groff

[11] Patent Number: 6,082,035
[45] Date of Patent: Jul. 4, 2000

[54] TURTLE DEVICE

[76] Inventor: Scott A. Groff, 708 Ridgeview Dr., Washington, Mo. 63090

[21] Appl. No.: 09/059,128

[22] Filed: Apr. 13, 1998

[51] Int. Cl.⁷ .................................................. A01M 31/06
[52] U.S. Cl. ..................................................... 43/2
[58] Field of Search .................................. 43/2; 446/153, 446/156, 158; D11/157; 116/22 A; D22/119, 120, 121, 125, 132

[56] References Cited

U.S. PATENT DOCUMENTS

| | | |
|---|---|---|
| D. 176,107 | 11/1955 | Carrick et al. . |
| D. 217,685 | 5/1970 | Steffens . |
| D. 230,758 | 3/1974 | Grieder . |
| 2,788,762 | 4/1957 | Wright . |
| 3,085,545 | 4/1963 | Ore . |
| 3,835,581 | 9/1974 | Grieder ................................. 446/158 |
| 5,046,983 | 9/1991 | Suzuki ................................... 446/158 |
| 5,454,183 | 10/1995 | Antonini et al. . |

Primary Examiner—Kurt Rowan
Attorney, Agent, or Firm—Lathrop & Gage L.C.

[57] ABSTRACT

The present invention relates to a turtle device preferably shaped and dimensioned to look like a snapping turtle, with the turtle device including a dorsal shell shaped and dimensioned to look like the dorsal shell of a turtle. It is additionally preferred for the turtle device to have appendages attached thereto. Preferably, the turtle device is comprised of a dorsal shell portion, ventral shell portion, head portion, tail portion, and leg members and is of a density that allows the turtle device to float. Typically, when the turtle device is placed on a lake, pond, or similar body of water, geese, which frequent the body of water and the surrounding land, will be repelled by the turtle like device and discouraged from frequenting the area. Thus, the present turtle device is used to keep geese from frequenting ponds and lakes, as well as the shoreline and surrounding land.

7 Claims, 2 Drawing Sheets

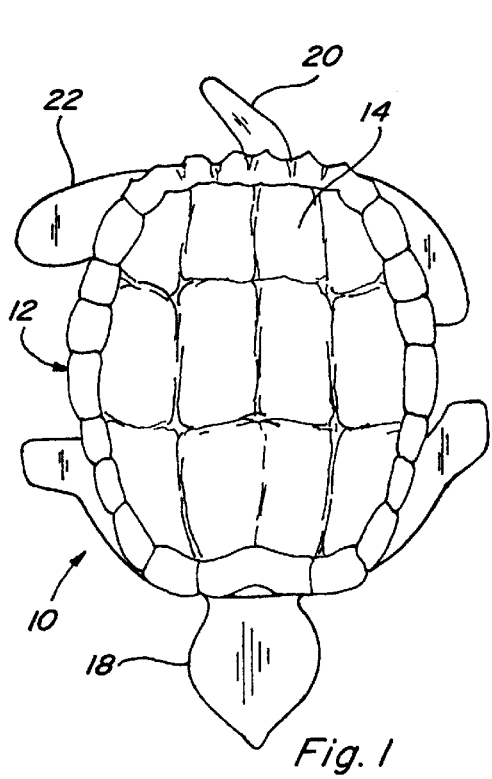
Fig. 1
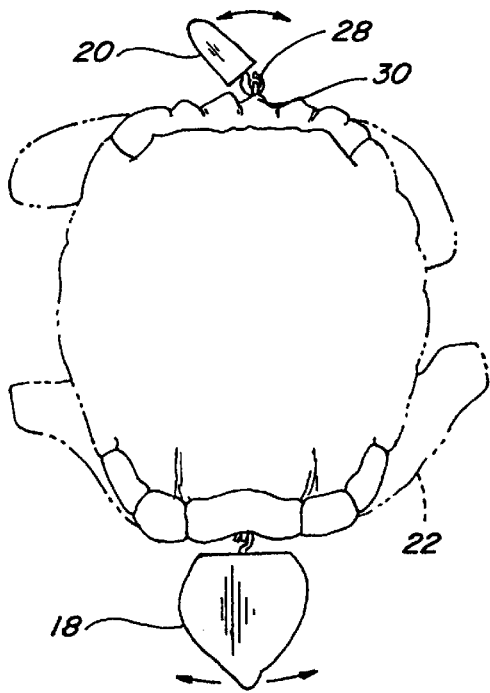
Fig. 4
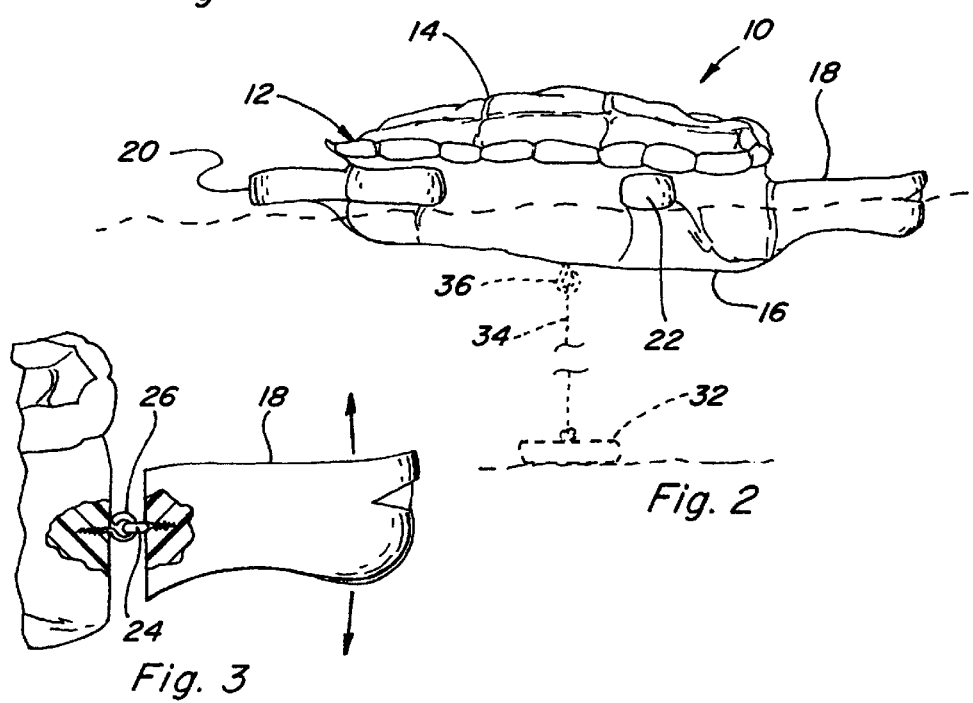
Fig. 2
Fig. 3

TURTLE DEVICE

FIELD OF INVENTION

The present invention relates to a device shaped and dimensioned to look like a turtle so that when in use such turtle device will discourage geese from frequenting a lake, pond, or other body of water, as well as, a land area.

BACKGROUND OF THE INVENTION

Geese tend to congregate on ponds, lakes, and other bodies of water and can be a nuisance to people. The geese are a problem because they defecate on the shore line of the various bodies of water, as well as the surrounding area, and occasionally chase or bite people. In fact it is known that geese will aggressively defend an area where they have congregated by chasing and biting people. The congregating geese can become such a problem that they prevent people from enjoyably using a pond or lake for activities such as swimming and sunbathing. Often this leaves land owners with only two alternatives, kill the geese or discontinue use of the lake or pond. Killing the geese, is often illegal and can be distasteful to many people. Thus, it is desirable to have some means of preventing geese from congregating on a lake or pond without killing or harming the geese.

Snapping turtles are a known natural enemy and predator of geese, as snapping turtles have been known to attack and bite adult geese and to eat goslings. It has been observed that when a flock of geese spot a snapping turtle on the shoreline or swimming in a body of water they will typically either congregate a long distance away from the turtle or avoid landing on the body of water. As a result, geese tend to avoid ponds or lakes which are inhabited by snapping turtles.

Because geese are such a nuisance, it would be desirable to have means available for ridding an area of a population of geese so that the area can enjoyably be used by humans. While killing the geese is one means available for ridding an area of geese, this is unacceptable because often such activity is illegal and can be offensive to some people. Consequently, it would be desirable to have some means for eliminating geese from an area without killing the geese.

SUMMARY OF THE INVENTION

The present invention relates to a turtle device which is designed to repel members of family Anatidae, with such family including geese, from an area where the device is placed, so that when the turtle device is in use geese are generally discouraged from landing on a pond, lake, or other body of water or frequenting the area where the present turtle device is placed. The present invention is designed and dimensioned to look like any of a variety of members found in Order Testudines, with the turtle device preferably designed and dimensioned to look like a snapping turtle. The snapping turtle is a preferred design because it is known that geese are afraid of snapping turtles and tend to avoid landing on bodies of water when they have spotted a snapping turtle inhabitating an area.

When in use the turtle device is placed in the water, on the shoreline, or both, as well as, any other area to discourage geese from landing on a particular body of water or inhabitating a particular area, and at the very least from landing near the turtle device. Because it is desirable to place at least one turtle device, and preferably a plurality of turtle devices, in the water it is desirable for the turtle device to be of a density that allows it to float. Generally, the turtle device has a density less than 1.0 gram/cubic centimeter (g/cc) which is a density sufficient to permit the device to float on water. The materials used to manufacture the turtle device preferably not only have a density less than 1.0 g/cc, but can be formed into a turtle shape, can be colored, are not degraded by water, and are not degraded by sunlight. Among the materials that are considered acceptable are polymeric foam, balsa wood, Styrofoam, plastic, plastic coated wood, and any of a variety of polymeric materials; however, numerous other materials may be used to form the present turtle device.

The construction of the turtle device requires a body portion comprised of at least a dorsal shell portion shaped and dimensioned to look like the carapace shell of a member of Order Testudines. In addition to the dorsal shell, the present invention preferably includes various appendages, including leg members, a head portion, and a tail portion all attached to the body portion, and all designed and dimensioned to resemble the various appendages found on members of Order Testudines. The appendages can be fixedly attached to the body portion, movably attached to the body portion, or a combination of movably and fixably attached appendages can be used in the construction of the present turtle device. It is desirable if at least the head portion is movably attached to the body portion. Also, the body portion may include a ventral shell portion attached to the dorsal shell portion, with the ventral shell portion either integrally connected to or fixedly attached to the dorsal shell portion. The ventral shell portion will preferably be designed and dimensioned to resemble the plastron shell found on a member of Order Testudines.

When in use, the present turtle device will be placed on a body of water or along the shoreline of a body of water. Preferably, a plurality of turtle devices will be used in combination, with the turtle devices being, for example, placed on the water and along the shoreline so that when a flock of geese attempt to use an area they will be discouraged from so doing by the present invention.

BRIEF DESCRIPTION OF THE DRAWINGS

FIG. 1 is a top plan view of a turtle device having fixedly attached appendages;

FIG. 2 is a side elevational view of the turtle device having fixedly attached appendages and shown attached to a weight member;

FIG. 3 is a partial cross-sectional side elevational view showing the head portion movably attached to the body portion;

FIG. 4 is a top plan view of the turtle device having a movably attached tail portion and a movably attached head portion;

DETAILED DESCRIPTION OF THE PREFERRED EMBODIMENTS

Figure 5:
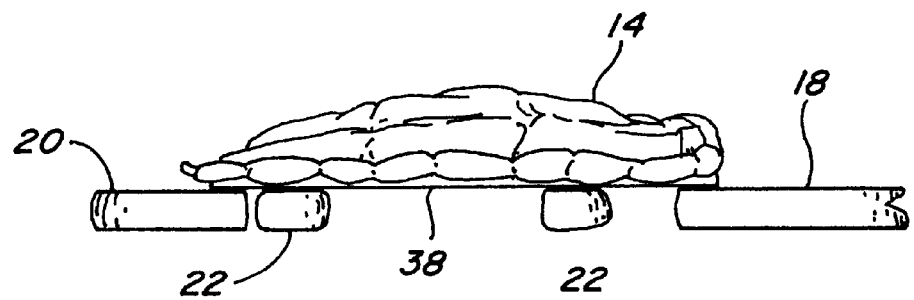
FIG. 5 is a side elevational view showing the turtle device without a ventral shell.

It is known that geese are afraid of turtles, especially snapping turtles, and as such geese tend to avoid areas that are visibly inhabited by snapping turtles. Geese can be a nuisance because they are known to attack people and because they tend to congregate in large numbers resulting in excessive amounts of excrement where they have gathered. The present invention relates to a turtle device 10, shown in FIG. 1, which is designed and dimensioned to look like one of any of a variety of members of Order Testudines, which includes turtles, so that when the turtle device 10 is placed in an area frequented by members of the taxonomic family Anatidae, more specifically geese, such members will be scared and disinclined to frequent such area. Specifically, the present invention relates to a turtle device 10 which is generally shaped and dimensioned to look like a snapping turtle, so that when in use the present turtle device will discourage geese from landing near the present device. The present turtle device 10 is especially useful because it can be designed to float on water, such as on a pond or lake, or can be placed along a shoreline so as to keep a pond or lake area substantially free of geese.

The present turtle device 10 for repelling geese can have a variety of constructions, so long as the device is of a sufficient size to be viewed from the air by incoming geese and looks sufficiently realistic to trick the geese into believing the device is a snapping turtle. The construction of the turtle device includes a body portion 12 preferable sized and dimensioned to look like the body of a snapping turtle. Importantly, the body portion 12 will include a dorsal shell portion 14 which is designed and dimensioned to look like a carapace shell found on a turtle. The body portion 12 must at least include a carapace shell in order to sufficiently mimic a turtle and preferable a snapping turtle. In other words, the dorsal shell 14 of the body portion 12 should resemble the dorsal shell of a turtle. The body portion 12 will have a diameter ranging in size from about six (6) inches to about six (6) feet. Preferably, however, the body portion 12 will have a diameter ranging in size from about one (1) foot to about three (3) feet.

In addition to the dorsal shell 14 the body portion 12 may optionally have a ventral shell 16 attached to the dorsal shell, with the ventral shell 16 designed and dimensioned to look like a plastron shell found on a member of Order Testudines. While the ventral shell 16 is optional it is preferred because it allows the turtle device 10 to achieve a more realistic appearance. When the body portion is manufactured, the ventral and dorsal shells may be made separately and attached to one another or the shells can be made simultaneously to form an integral design, which is shown in FIG. 2. Additionally, the body portion can be hollow or can be of a solid construction. The ventral shell can be made from the same material as the dorsal shell or can be made from a material other than that used to form the dorsal shell.

The body portion 12 preferably has a plurality of appendages attached thereto. Included among the appendages that may be attached to the body portion 12 are a head portion 18, a tail portion 20, and at least one leg member 22. The head portion 18 will be shaped and dimensioned to resemble the head of a member of Order Testudines, with the size of the head being proportional to the size of the body portion. Preferably, the head portion will resemble the head of a snapping turtle. Additionally, the head portion 18 may be rigidly affixed to the body portion 12 as shown in FIGS. 1 and 2, or alternatively the head may be movably attached to the body portion as shown in FIGS. 3 and 4. If the head portion is rigidly affixed to the body portion, it may be manufactured simultaneously with the body portion to form a unitary construction or the head portion may be affixed to the body portion by fastening the head portion to the body portion. The head portion can be affixed to the body portion by screwing the head portion into the body portion or by gluing the head portion onto the body portion. Regardless of the exact means used to attach the head portion to the body portion a variety of means can be used so long as the head portion is securely fastened to the body portion.

As mentioned, the head portion 18 may be movably attached to the body portion 12. This can be accomplished by attaching an eye hook 24 to the head portion 18 and an eye hook 26 to the body portion 12 and then connecting the two eye hooks, as shown in FIG. 3. Another way to movably attach the head portion and body portion is to connect the two parts through use of a spring member. A variety of other means can be used to movably connect the two parts such that any means are acceptable as long as the connection means allows for movement of the head portion relative to the body portion as shown in FIGS. 3 and 4. Also, the head portion is preferably made out of the same material as the body portion, but alternatively can be made out of a material other than that used to form the body portion.

Opposite the head portion 18 a tail portion 20 can be attached to the body portion 12. The tail portion 20 will be shaped and dimensioned to resemble the tail of a member of Order Testudines, with the size of the tail being proportional to the size of the body portion. Again, like the head portion 18 the tail portion 20 can be fixedly attached to the body portion 12 as shown in FIGS. 1 and 2, or the tail portion can be movably attached to the body portion as shown in FIG. 4. If the tail portion 20 is fixedly attached to the body portion it can be formed integral with the body portion 12 or can be formed separately and then fixedly attached to the body portion. If the tail portion 20 is rigidly affixed to the body portion 12 it may be manufactured simultaneously with the body portion to form a unitary construction or the tail portion may be affixed to the body portion by fastening the tail to the body portion. The tail portion can be affixed to the body portion by screwing the tail portion into the body portion or by gluing the tail portion onto the body portion. Regardless of the exact means used to attach the tail portion to the body portion a variety of means can be used so long as the tail is securely fastened to the body portion. Also, the tail portion is preferably made out of the same material as the body portion, but alternatively can be made out of material other than that used to form body portion.

If the tail portion 20 is movably attached to the body portion 12 this can be accomplished by using a variety of means for movably attaching the tail portion to the body portion. Like the means used to movably attach the head portion to the body portion, the tail portion can be connected by attaching an eye hook 28 to the tail portion 20 and an eye hook 30 to the body portion 12 and then connecting the two eye hooks. Another way to movably attach the tail portion to the body portion is to use a spring and attach the respective ends of the spring to the body portion 12 and the tail portion 20. Regardless of which means for movably attaching the tail portion to the body portion are selected it is necessary to select means which can be attached to the tail portion and the body portion and which allow for movement of the tail portion relative to the body portion. As such, a variety of movable attachment means can be selected for movably connecting the tail portion to the body portion.

Appendages designed and dimensioned to resemble the legs of a member of Testudines may be included in the construction of the present device. The leg members 22 are located between the head portion 18 and the tail portion 20 and are roughly perpendicular to the head and tail portions. In general, the leg members 22 will protrude away from the body portion 12 of the turtle device 10. The leg members are designed and dimensioned to resemble the legs of a member of Order Testudines. The leg appendages are preferred, but are not required in the present construction, as shown in FIG.

7. The leg members 22 may be made from the same material as the body portion or can be made from a material other than that used to form the body portion. At least one leg member can be attached to the body portion and preferably a plurality of leg members are attached to the body portion. It is most preferred, however, to attach four (4) leg members to the body portion.

Like the other appendages already mentioned, the leg members 22 can be fixedly attached to the body portion 12, as shown in FIG. 1, or can be movably attached to the body portion. If the leg members are fixedly attached to the body portion they can be formed integral with the body portion or can be formed separately and fixedly attached to the body portion. To fixedly attach the leg members to the body portion a screw can be used to hold a leg member onto the body portion or the leg member can be glued onto the body portion. A variety of different means can be used to fixedly attach a leg member appendage to the body portion, with any means available so long as the leg member is adequately held onto the body portion.

If the leg members 22 are movably attached to the body portion 12 this can be accomplished in a similar manner as that used to movably attach the head portion 18 and tail portion 20 to the body portion. A pair of eye hooks can again be used to hold a leg member onto the body portion or a spring can be used to hold a leg member onto the body portion.

When completed, the present turtle device 10 will preferably resemble a snapping turtle, however, the present turtle device may also resemble other types of turtles and tortoises found in Order Testudines. It is most preferred for the completed turtle device 10 to have four (4) leg members 22, a movable head portion 18, a movable tail portion 20, and a body portion 12 comprised of a ventral 16 and dorsal 14 shell. The body portion and various appendages can be either solid, hollow, or a combination thereof. Importantly, it is preferred for the turtle device 10 to have a density less than 1.0 g/cc, with the density determined according to a standard water density. The necessity of having a density less than 1.0 g/cc comes from the desire to have a turtle device that will float on water, as generally a device will not float on water if it has a density greater than 1.0 g/cc. While it is not required, it is preferred to have a turtle device that will float. The turtle device can be used by placing it on the ground, or more typically on a shoreline; however, since the device is generally used around a pond or lake it is preferable for the device to float so that a user has the option of placing the turtle device on a solid surface or on a pond, or other body of water.

Materials that can be used in the construction of the turtle device include, but are not limited to, polymeric foam, Styrofoam, balsa wood, plastic, plastic coated wood, polymeric materials, and any other materials that can be shaped into a turtle, can float, can be colored, and are water resistant. Polymeric foam is the most preferred material because it can be used with a mold to form a unitary turtle device and generally has a density of less than 1.0 g/cc. Additionally, polymeric foam can be painted or colored, is water resistant, and resistant to ultraviolet (U.V.) light. One other advantage of polymeric foam is that items can be glued to the cured polymeric foam and holes can be drilled in the cured foam, meaning appendages can be easily attached. Also, the turtle device is preferably painted to resemble a turtle and polymeric foam is ideal for use because it can be painted.

It is also preferred to attach a weight 32 to the turtle device 10, as shown in FIG. 2, so that if the turtle device 10 is placed in the water the weight 32 will perform the function of an anchor and prevent the device from floating onto shore or to an undesired portion of the body of water. The weight 32 can be any of a variety of materials so long as it prevents the device from moving to far from the location where the device was placed. The weight can be attached to the turtle device in a number of ways. Preferably, the weight is attached by connecting one end of a piece of string 34 to an eye hook 36 connected to the bottom of the turtle device 10 and attaching the other end of the string 34 to the weight 32, as shown in FIG. 2. Other means, however, can be used to anchor the turtle device 10. Generally, the weight is preferably attached to the ventral shell 16 or to the bottom 38 of the dorsal shell. The weight can, however, be attached anywhere to the turtle device, so long as the device is anchored and the weight and means of attachment are not conspicuous.

Figure 6:
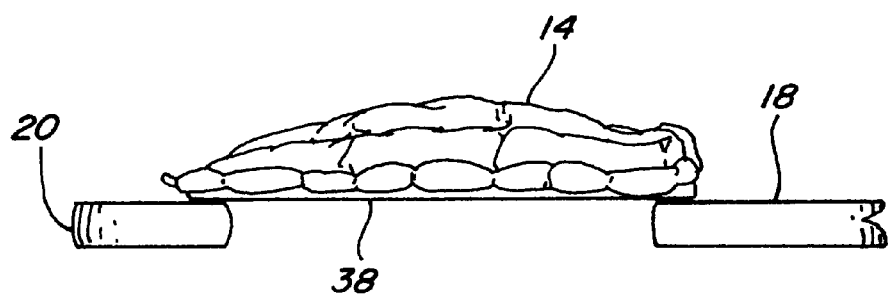
FIG. 6 is a side elevational view showing the turtle device without leg members; and, FIG. 7 is a top plan view of the turtle device without leg members.
Figure 7:
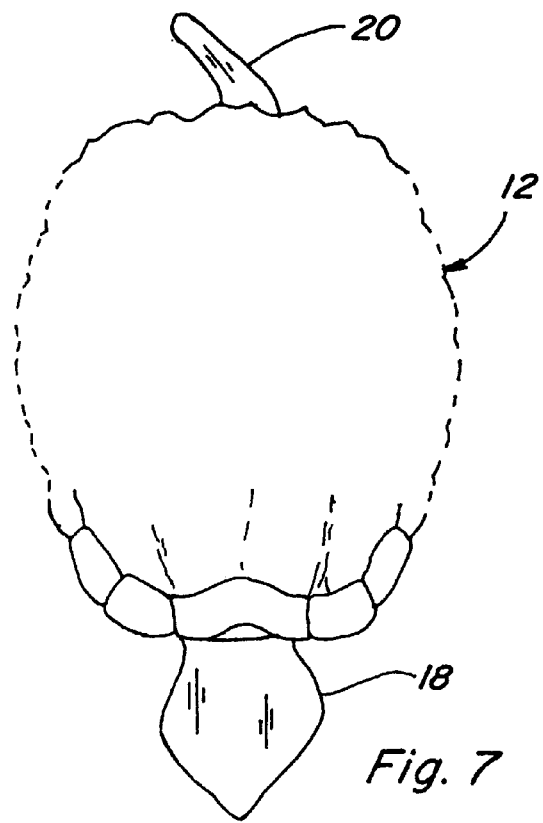

An alternative construction to the ventral shell 16 can include a body portion 12 comprised only of a dorsal shell 14, as shown in FIGS. 5 and 6. In such a turtle construction, as that shown in FIGS. 5 and 6, the appendages are attached directly to the bottom 38 of the dorsal shell 14. This turtle device 10 construction is desirable because when viewed from above it still looks like a snapping turtle, but instead uses a lesser amount of material.

The method for making the present device can include forming a mold to resemble a member of Order Testudines, adding a polymeric material to the mold, allowing the polymeric material to cure to resemble the turtle device, removing the turtle device from the mold, and painting the turtle device. Instead of painting the device the polymeric material could be colored prior to curing. An alternative method involves carving the turtle device out of wood and then coloring the carved turtle device. The general method includes, however, forming a device that resembles a member of Order Testudines and making sure the color of the turtle device resembles the color of a member of Order Testudines.

As stated, the device is primarily used to scare geese so that they will not land on or near ponds and lakes, for example. By scaring away the geese, problems associated with geese are prevented and humans can more readily enjoy the lake, pond, or other type of waterway or body of water. As such, the present turtle device is constructed, designed, and dimensioned to deter geese from inhabitating an area.

Thus, there has been shown and described a novel device shaped and dimensioned to look like a turtle so that when in use such device will discourage geese from frequenting a lake, pond, or other body of water, as well as, a land area which fulfills all the objects and advantages sought therefore. It is to be apparent to those skilled in the art, however, that many changes, variations, modifications, and other uses and applications for the subject device are possible, and all such changes, variations, modifications, and other uses and applications which do not depart from the spirit and scope of the invention are deemed to be covered by the invention which is limited only by the claims which follow.

What is claimed is:

1. A turtle device for scaring members of taxonomic family Anatidae, which is shaped and dimensioned to look like any of a variety of members of Order Testudines, wherein said turtle device consists of a solid body portion having a diameter ranging in size from about one foot to about three feet, a head member shaped and dimensioned to resemble a turtle head, wherein said head member is movably attached to said body portion, and a tail member shaped and dimensioned to resemble a turtle tail, wherein said tail member is movably attached to said body portion, said body portion having a dorsal shell portion designed and dimensioned to look like a carapace shell found on a member of Order Testudines, which is made from any material having a density less than 1.0 g/cc, so that when said turtle device is in use said turtle device will prevent members of the family Anatidae from congregating on or near an area.

2. The turtle device of claim 1 wherein said turtle device can include at least one leg member, with said leg member designed and dimensioned to resemble a turtle leg and located between said head member and said tail member.

3. The turtle device of claim 2 wherein said leg member is fixedly attached to said body portion of said turtle device.

4. The turtle device of claim 2 wherein said leg member is movably attached to said body portion of said turtle device.

5. The turtle device of claim 1 wherein said body portion includes a ventral shell portion attached to said dorsal shell portion.

6. The turtle device of claim 1 wherein said turtle device is made from any material having a density less than 1.0 g/cc and wherein said material can be colored.

7. The turtle device of claim 1 wherein a weight is attached to said turtle device.

\* \* \* \* \*